United States Patent [19]

Myllymäki et al.

[11] Patent Number: 5,312,636
[45] Date of Patent: May 17, 1994

[54] PROCESS FOR FRACTIONING CROP INTO INDUSTRIAL RAW MATERIAL

[75] Inventors: Olavi Myllymäki; Yrjö Mälkki; Karin Autio, all of Espoo, Finland

[73] Assignee: Valtion Teknillinen Tutkimuskeskus, Espoo, Finland

[21] Appl. No.: 994,465

[22] Filed: Dec. 21, 1992

Related U.S. Application Data

[63] Continuation of Ser. No. 752,994, Sep. 3, 1991, abandoned, which is a continuation of Ser. No. 460,891, filed as PCT/FI88/00125, Aug. 10, 1988, published as WO 89/01294, Feb. 23, 1989, abandoned.

[30] Foreign Application Priority Data

Aug. 12, 1987 [FI] Finland .................................. 873499

[51] Int. Cl.$^5$ ................................................ A23L 1/10
[52] U.S. Cl. ...................... 426/417; 426/430; 426/436; 426/481; 426/507; 426/518
[58] Field of Search ............................. 426/463

[56] References Cited

U.S. PATENT DOCUMENTS

| | | | |
|---|---|---|---|
| 2,176,022 | 10/1939 | Musher | 426/543 |
| 2,898,210 | 8/1959 | Dale et al. | 426/457 |
| 3,704,134 | 11/1972 | Ronai et al. | 426/457 |
| 3,909,288 | 9/1975 | Powell et al. | 127/68 |
| 3,979,375 | 9/1976 | Rao et al. | 426/436 |
| 4,028,468 | 6/1977 | Hohner et al. | 426/436 |
| 4,089,848 | 5/1978 | Bell et al. | 426/565 |
| 4,211,695 | 7/1980 | Oughton | 426/656 |
| 4,211,801 | 7/1980 | Oughton | 426/430 |
| 4,220,287 | 9/1980 | Boczewski | 241/9 |
| 4,428,967 | 1/1984 | Goering et al. | 426/52 |
| 4,435,429 | 3/1984 | Burrows et al. | 426/463 |
| 4,497,840 | 2/1985 | Gould et al. | 426/463 |
| 4,620,981 | 11/1986 | Gordon et al. | 426/448 |

FOREIGN PATENT DOCUMENTS

| | | | |
|---|---|---|---|
| 0028518 | 5/1981 | PCT Int'l Appl. | A23J 1/12 |
| 8601080 | 2/1986 | PCT Int'l Appl. | A23L 1/10 |
| 1526553 | 9/1978 | United Kingdom | C11B 1/10 |

OTHER PUBLICATIONS

"Extraction of High-Viscosity Gums From Oats", P. J. Wood, I. R. Siddiqui and D. Patan, *Cereal Chemistry* 55, pp. 1038 to 1049 (1978).

*Primary Examiner*—Donald E. Czaja
*Assistant Examiner*—Anthony Weier
*Attorney, Agent, or Firm*—Cushman, Darby & Cushman

[57] ABSTRACT

A process for fractioning crops by using a combined dry and wet milling and extraction methods, whereby extruding or percussive devices and operating methods are used in the dry milling step, and a thermal treatment, solvent extraction and mechanical treatment, which destroy most of the enzymes, are combined in the first wet milling step.

4 Claims, 1 Drawing Sheet

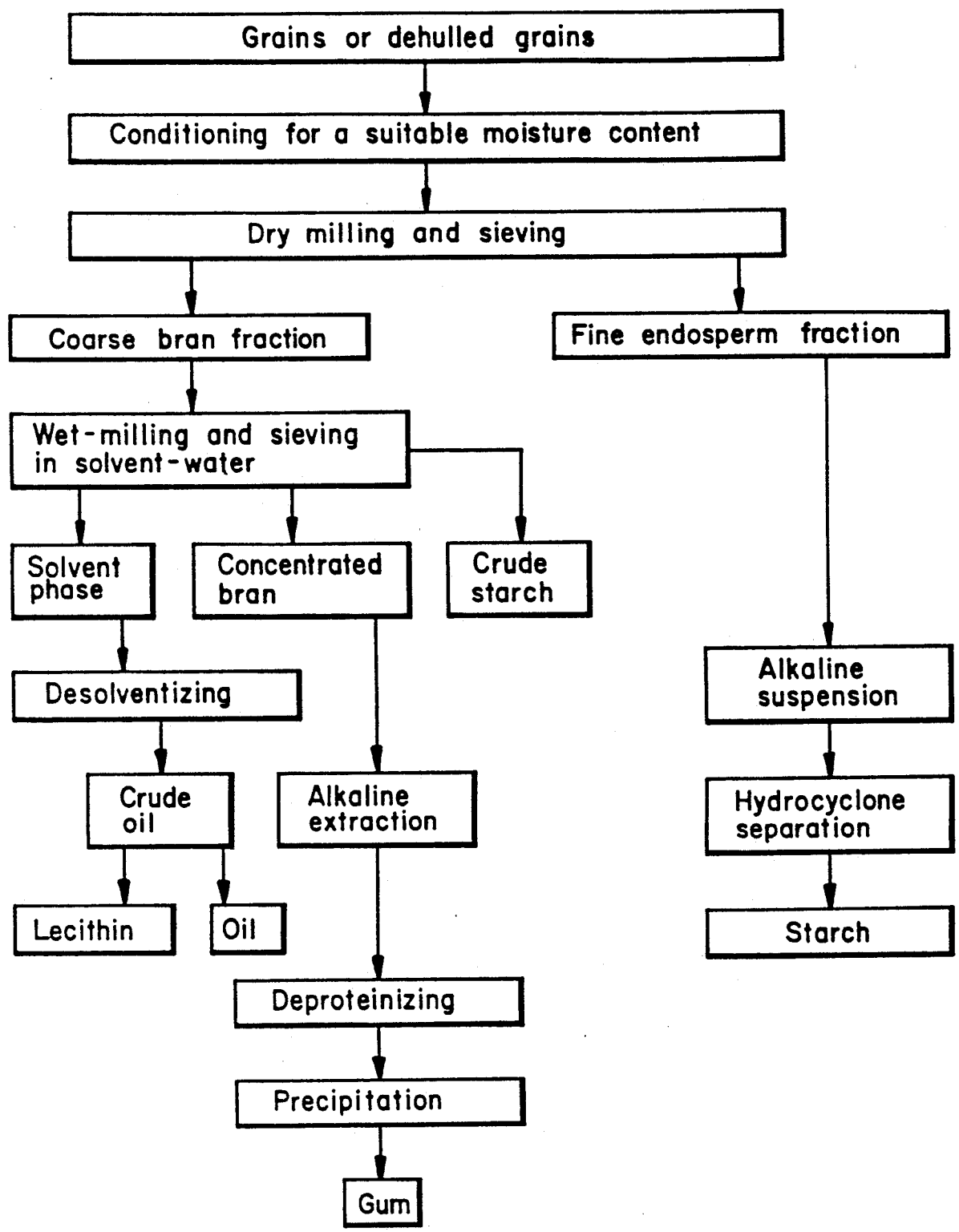

PROCESS FOR FRACTIONING CROP INTO INDUSTRIAL RAW MATERIAL

This is a continuation of application Ser. No. 07/752,994, filed on Sep. 3, 1991, which was abandoned upon the filing hereof, which is itself a Rule 62 continuation of Ser. No. 07/460,891, filed as PCT/FI88/00125, Aug. 10, 1988, published as WO 89/01294, Feb. 23, 1989, now abandoned.

BACKGROUND OF THE INVENTION

Besides the use for conventional foodstuff purposes, the botanical or chemical components of crop raw material have been isolated to be used for industrial purposes. The most extensive industrial implementations are starch separating processes using corn, wheat and barley as a raw material. The main by-products of these processes are gluten, which is recoverable from corn and wheat, other protein fractions, corn oil, and wheat germ oil, as well as fractions mainly used as feed. The methods conventionally used for separating starch from crop raw material can be classed into wet milling methods or combinations of dry process steps and wet milling.

In grain fractioning, various mechanical methods are used, such as screening, air classification, sedimentation as well as extracting and dissolving processes. For oat grinding, milling devices generally suitable for the grinding of other crops have been applied. The U.S. Pat. No. 4,220,287 discloses a roll milling device equipped with either smooth or fluted rolls.

For oat fractioning, prior known methods in most cases relate to separating an individual component from the oat grains. The protein separation of oats has been an object for the most extensive study, the central method having been dissolving protein into basic solutions and precipitating by means of acids at the isoelectric point.

In several described processes, the alcalic extraction is preceded by a solvent extraction by means of hydrocarbon, halogenated hydrocarbon, aliphatic alcohols, or acetone, in order to remove the crude oil, aiming at facilitating the subsequent separating steps and at improving the preservability of the end products. The impact of various solvents and temperatures on the extraction yield is known through scientific literature, including British patent specification 1 526 553, among others. In certain methods, such as the one described in the U.S. Pat. No. 4,211,801, an organic solvent has been used as a medium to separate bran and endosperm fractions from each other.

The separation of oat gum is described in several processes, as in the method disclosed in U.S. Pat. No. 4,028,468, as well as in other scientific literature, being accomplished by extracting into an aqueous or alcalic solution and by precipitating with the aid of aliphatic alcohol or ammonium sulphate. In some processes, like the one disclosed in U.S. Pat. No. 4,435,429, the gum material is allowed to be hydrolyzed in order to reduce the viscosity, and is not recovered.

The antioxidative effects of oats are known from research publications. Phenolic compounds, like caffeic and pherulic acid derivatives, are considered major antioxidative factors, however some other oil components, tocopherols, among others, also have a synergetic effect. Nevertheless, this phenomenon has not been technically exploited. In certain processes, such as the one disclosed in the British patent specification 1 526 553 and U.S. Pat. No. 4,211,801, hydrogen peroxide is used to clarify the oil, and this procedure can be considered to bring about the inactivation of antioxidative factors possibly present. It is likewise known that many other fatty vegetable grains contain polyphenol compounds that have an antioxidative effect. The limited solubility into fats of these compounds has prevented their technical exploitation.

The methods for oat fractioning disclosed in patent literature so far rarely present the final fraction yield, which is one of the most essential criteria when evaluating the profitability of the process. The exact composition of the final fractions is rarely expressed, and most seldom is there given information about the physical or other properties of the end products, which would allow one to deduce properties of the fraction significant for industrial use, such as the viscosity and the molecular weight with regard to the vegetable gum fraction, the purity or residual protein content of the starch fraction and the proportions of various lipid fractions in the fat fraction. In the cited methods, the concentration of a component to a certain fraction is usually achieved, but not the degree of concentration or purity prerequisited by the technical use of the fraction. Major known oat fractioning processes are disclosed in the introductory portion of the specification of U.S. Pat. No. 4,435,429. As far as is known, none of them has resulted in a permanent technical application.

SUMMARY OF THE INVENTION

An object of the present invention is to provide a process for fractioning crop grains, in particular oat grains, so as to obtain a high yield and the purity degree required for technical use, for several of the isolated fractions, and to retain as far as possible the functional properties characteristic of the components of the various fractions. This is achieved according to the invention by using extruding or impact devices and operating methods in the dry milling step of the crop, and by combining a heat treatment, solvent extraction and mechanical treatment, which destroy the major part of the enzymes, in the first wet milling step.

Among the functional properties of the components, the purity of the starch is to be considered the most important in particular with regard to the residual protein content, the viscosity properties with regard to the vegetable gum fraction, the anti-oxidative effect and the content of emulsifying components with regard to the fat fraction, and the amino acid composition with regard to the protein fraction. The possible application fields for these fractions can comprise, as to the starch, food, paper, board, plastic and chemical industry uses among others, as to the vegetable gum fraction, use in thickening agents in the food, chemical and pharmaceutical industries, and as soluble dietary fiber in food and pharmaceutical preparations, for the fat fraction, use in edible fats and in preparation of emulsifiers, and for the protein faction, the use in foodstuffs and feeds.

BRIEF DESCRIPTION OF THE DRAWING

In the drawing:
The FIGURE is a flow chart of the process described herein.

DETAILED DESCRIPTION

In the first step of the process of a preferred embodiment of the present invention, the outer covering layer of the oat grains, the husks, are removed by means of a known technique, unless hulless oat cultivars are used. The dehulling should be carried out so as to remove a minimum of the portion below the pericarp layer.

The removal of crude oat oil can be optionally carried out in the different steps. However, an efficient extracting effect requires either milling or flaking of the grains. For this reason, the first size-reducing operation subsequent to the dehulling is preferably accomplished by using a roll mill or some other appropriate device, in which particle adhesion to the various parts of the device caused by the fat can be prevented by means of the operating method, the sieve dimensioning, and possibly also by use of air jets. A suitable procedure for this purpose is, e.g., grinding through a smooth pair of rolls and subsequent screening with the aid of a sieve having a 0.2 to 0.5 mm mesh.

The fraction remaining on the sieve can be further reduced by using an impact mill, for instance a hammer mill without sieves. The fraction thus reduced is screened through a 0.1 mm mesh sieve, e.g. by an air jet sieve.

In terms of the present invention, it is important to avoid a cutting operation as far as possible in the size-reducing operations, so that the aleurone layer of the grain and the immediately connected portion containing vegetable gum are retained as large particles. The cohesion of these portions is improved by the fat content and a suitable moisture content in the grinding step, and it can be increased by denaturing protein e.g. by means of a heating treatment.

According to the final purposes of use of the fractions and to the composition and quality requirements, the extraction of lipids is performed on the entire batch or only on the bran portion, where the fat content is higher than in the endosperm fraction. Preferable solvents according to the invention are polar solvents such as 2-propanol, ethanol or acetone, or mixtures of these and water, in order to increase the amount of extracted polar lipids and the total yield of lipids. The preferable temperature range is 50° to 90° C. In order to minimize the oxidation and hydrolyzation reactions of the lipids, it is important to inactivate a major part of the lipase and lipoxydase activity of the oat grains by means of a heating or other denaturing treatment carried out as early as possible. The same treatment inactivates the beta-glucanase activity and denatures the proteins of the grain. The treatment can be effected, e.g., by vaporizing at the flattening stage of the grains by means of prior known technique or by extracting by a hot solvent, whereby the denaturing and inactivating effect on the enzymes of the solvents and/or solvent-water systems and/or acidity also can be exploited. However, the heating treatments have to be controlled so as to avoid a simultaneous sizing of the starch. The polarity and/or density of the organic solvent is adjustable by adding water or other organic solvents.

The extraction step can be combined with the separation of the endosperm and bran fractions. Provided that the size-reducing operations preceding the extraction have been effected as indicated above, the endosperm fraction is separated, in the extraction and under the effect of the mechanical forces then exerted, as a finely divided fraction, and the bran remains in the coarser fraction. These two fractions can be separated from each other by screening in a solvent suspension, by using a 0.08-0.125 mm mesh sieve, or by means of sedimentation or hydrocyclonic treatments.

The most valuable component of the endosperm fraction is the starch. It can be separated from the other components of the endosperm fraction by means of techniques known in starch industry, such as sedimentation or hydrocyclonic treatments or air classification. Besides, in the aqueous phase, the sedimentation and hydrocyclonic treatments can also be carried out in an organic solvent. When aiming at low residual protein contents of desiring to reduce the number of operation steps, extraction from an alcalic solvent is preferably used to separate the protein from the starch.

When using dry separating operations, the bran fraction remaining on the sieve is approximately 27 to 35% of the amount of dehulled oats. By choosing favourable processing conditions the proportion of the bran fraction can be reduced to about 20% of the mass of the dehulled oats by using the separation in a solvent suspension described above. The bran fraction thus concentrated is capable of being used as such in order to increase the dietary fiber content of foodstuffs and clinical alimentary preparations, but the beta-glucan can be further separated for use as a soluble dietary fiber or for the preparation of thickening or binding agents.

The beta-glucan is extracted from the bran fraction in a water or alcalic solution, at a temperature of 50° to 75° C., preferably at a temperature of about 70° C. In order to make it technically possible to separate the viscous extracting solution from the solid matter, the amount of extracting solution must be 200-fold, preferably 300-fold to the amount of beta-glucan in the bran. When using alcalic extraction, the protein of the bran is dissolved at the same time. It is precipitated at the isoelectric point and is separated, e.g. by centrifugation. The pH of the clear solution is now raised to 7 pH, and the beta-glucan is precipitated by means of alcohol, e.g. ethanol or isopropanol or ammonium sulphate. When precipitating by means of alcohol, the beta-glucan is precipitated as a threadlike deposit which is easy to separate by screening. The concentration obtained can be further purified by elutriating into a small amount of alcohol. The beta-glucan can be retained suspended in the alcohol without deteriorating the viscosity properties, or it can be dried by air drying or at under-pressure.

When using polar solvents for extracting the fat, it is known that a greater amount of polar lipids are transferred into the extract than by using non-polar solvents. It has been observed in this study that the extraction of compounds having an antioxidative effect is strongly dependent on the polarity of the solvent. It has also been observed that they remain dissolved in crude oat oil, unless it is further refined to remove the polar lipids, and that such an crude oat oil has an antioxidative effect also when being added to other oils.

The invention is further described below by means of examples.

EXAMPLE 1

Dehulled oats were ground through a smooth pair of rolls and screened through a 0.2-0.3 mm mesh cylindrical sieve. The weight part of the separated fine endosperm fraction was 60-65%, its starch content was 80-81%, protein control 10-11%, fat content 5.8% and beta-glucan content about 1%. Correspondingly, the starch, protein, fat and beta-glucan contents of the bran fraction were respectively 40-43; 18-20; 7.8 and 11-12%. The dietary fiber content of the bran fraction was 29%.

EXAMPLE 2

The dehulled oats were ground through a smooth pair of rolls, and treated by means of a hammer mill without screening. The mixture was suspended into a sixfold weight quantity of water-2-propanol mixture (15:85% v/v), and the soluble components of this mixture were subjected to solvent extraction in this suspension for 2 hours under agitation. By screening through a 0.125 mm mesh sieve, a fine endosperm fraction was separated from the suspension, the dry weight of which was 71% of the weight of the dehulled oats. Its starch, protein, fat and beta-glucan contents were respectively 85; 10.5; 1.5 and 1%. Correspondingly, the weight part of the bran fraction remaining on the sieve was 24% of the amount of dehulled oats, and its starch, protein, fat beta-glucan contents were 35; 23; 2 and 15.5%, its ash content 3.5% and dietary fiber content 35%.

EXAMPLE 3

The bran fraction of Example 1 was concentrated by elutriating into a sixfold weight amount of water-alcohol mixture at 75°-78° C. which contained 80 volume-% of 2-propanol and 20 volume-% of water. The mixture was vigorously homogenized by a blade mixer for approximately 3 minutes, and was subsequently mixed by a paddle mixer for 1 to 2 hours. The solid matter was screened by a 0.125 mm mesh sieve, whereby the concentrated bran fraction remained on the sieve, the dry weight of which was approximately 20% of the weight of the dehulled oats batch. Its beta-glucan content was 17 to 18%, the total dietary fiber content 35 to 39% and protein content 20 to 24%. The starch content of the solid matter having passed through the screen was 83 to 86%. When effecting a batch process, about 75% of the oil content of the bran was transferred into the extraction solution by one extraction.

EXAMPLE 4

The bran concentration prepared according to Example 3 was extracted to a 9.5 pH value in a regulated sodium hydroxide solution at a temperature of 70° C. for 2 hours. In order to facilitate the further processing of the viscous solution subsequent to the extraction, the amount of extracting solution was about 40-fold to the amount of solid matter, i.e. 200 to 300-fold to the amount of beta-glucan. The extracted protein was precipitated by adjusting the pH value of the solution to pH 4.5, and the protein was separated by centrifugation. The pH of the solution was now adjusted to 7.0 and the beta-glucan was precipitated by directing the viscous beta-glucan solution into ethanol or propanol, under simultaneous vigorous agitation, until the alcoholic concentration of the mixture was reduced to 50% by weight. The beta-glucan was precipitated as a thread-like mass which was easily separated from the solution onto a 0.2 mm mesh sieve or by means of a filter press. After washing with 2-propanol, the deposit was dried by evaporating the solvent at a temperature of 35° C. The beta-glucan content of the preparation was 80%, the residual protein content was 2 to 4% and the starch content was 2 to 3%.

EXAMPLE 5

The starch was separated from the endosperm fraction of Example 2 by extracting the endosperm fraction by a sodium hydroxide solution, the pH of which was 9.5, at a temperature of 40° C. The solid matter was separated from the solution by means of a hydrocyclone. The residual protein content of the starch obtained after repeated washing steps was 0.4% and the residual fat content was 0.5%.

EXAMPLE 6

The solvent was removed by evaporation from the isopropanol extract of Example 2. The oil obtained was added to refined corn oil 3%, and the stability of the oil to oxidation was tested by the Rancimat procedure and device by leading oxygen through the oil at 110° C., by absorbing the oxidation results produced by the exhaust gas into an absorption solution and by observing the change taking place in the electroconductivity of the latter. The increase of the oxidation induction time caused by the crude oat oil addition was the same as when 0.2% butylated hydroxyanisol was added. The antioxidative properties were observed also in the lecithin fraction of the oil.

EXAMPLE 7

1000 kg of dehulled and steam-treated oat kernels were ground with a pilot-scale roll milling equipment. From the rolls, the powder was conducted to a 670 $\mu$m vibrating screen, and the remaining bran was further purified by a bran centrifugator. The proportion of flaked bran was 41% by weight and the beta-glucan content 9.0%, the proportion of flour was 50% by weight and its glucan content 1.6%.

By further screening of the bran with the aid of an air jet sieve, the beta-glucane content of the bran remaining on a 75 $\mu$m sieve was increased to 11.7%.

The grinding of the oat flakes dehulled, flattened and solvent extracted from the same raw material was technically difficult to carry out with the equipment. Owing to the extraction of the lipids, the flakes broke and the share of bran after the screening was about 19% by weight and the beta-glucan content 11% and the beta-glucan content of the endosperm fraction having penetrated was 2.6%. The beta-glucan content of the bran could not be further concentrated by means of the air jet sieve.

The above examples are based on experiments carried out with oat grains. Besides oats, the process is suitable, where applicable, also for fractioning the grains of other crops.

We claim:

1. A process for concentrating and separating dietary fiber, starch, antioxidant oil, protein and gum products from dehulled or hull-less oat grains, comprising:
   (a) dry milling of dehulled or hull-less oat grains by using at least one of pressing, flaking or impacting operations, such that said milling does not include substantial shearing of said grains, whereby a mixture of coarse bran and a first fine endosperm are provided;
   (b) dividing said mixture into a first fine endosperm fraction and a coarse bran fraction;
   (c) forming a suspension of said coarse bran fraction with an extraction mixture of polar organic solvent and water, agitating said suspension, thereby substantially inactivating enzymes present in said coarse bran fraction, and separating said suspension by at least one of sieving, sedimentation and hydrocyclonic treatment into a coarse concentrated bran fraction and a second fine endosperm fraction, and a lipid fraction, whereby said lipid fraction contains antioxidants which are extracted by said extraction mixture of polar organic solvent and water;

(d) extracting beta glucan from said coarse concentrated bran fraction by successively:
  (i) subjecting said coarse concentrated bran fraction to alkaline solution at a temperature of 50° to 75° C., and separation, such that a degummed coarse concentrated bran fraction and an extract are provided;
  (ii) deproteinizing said extract by isoelectric precipitation and separation to provide a protein product and a deproteinized extract, and
  (iii) precipitating beta glucan from said deproteinized extract by mixing said deproteinized extract with a precipitating agent selected from the group consisting of ethanol, 2-propanol and a solution of ammonium sulphate, thereby forming a fibrous precipitate of beta glucan;

(e) separating starch from said first or second fine endosperm fraction by extraction with an alkaline solution at about 40° C., followed by at least one of sedimentation, hydrocyclonic treatment or air classification.

2. The process of claim 1, wherein said dry milling further comprises a succession of grinding said dehulled or hull-less oat grains between smooth rolls to produce flakes, and hammer milling said flakes.

3. The process of claim 1, wherein said suspension of said coarse bran fraction and said extraction mixture of polar organic solvent and water are agitated data temperature of between 50° and 90° C., such that enzymes in said suspension are deactivated.

4. The process of claim 3, wherein said extraction mixture is selected from the group consisting essentially of:
  (i) ethanol and 5 to 20 percent water by weight of ethanol; and
  (ii) 2-propanol and 10 to 20 percent water by weight of 2-propanol.

* * * * *